United States Patent [19]

Silberring

[11] 4,391,794

[45] Jul. 5, 1983

[54] PROCESS AND APPARATUS FOR HYDROGEN PRODUCTION

[76] Inventor: Ludwig Silberring, Wipkingerplatz 7, Zürich, Switzerland

[21] Appl. No.: 200,491

[22] PCT Filed: Aug. 20, 1979

[86] PCT No.: PCT/CH79/00112
§ 371 Date: Jul. 21, 1980
§ 102(e) Date: Jun. 13, 1980

[87] PCT Pub. No.: WO80/01065
PCT Pub. Date: May 29, 1980

[30] Foreign Application Priority Data
Nov. 21, 1978 [CH] Switzerland .......... 11935/78

[51] Int. Cl.³ .................................. C01B 1/13
[52] U.S. Cl. .......................... 423/650; 252/373; 422/197; 422/199
[58] Field of Search ............ 423/650; 252/373; 422/197, 199

[56] References Cited

U.S. PATENT DOCUMENTS

| 2,235,401 | 3/1941 | Gier . | |
|---|---|---|---|
| 2,799,640 | 7/1957 | Pevere et al. | 423/650 |
| 2,894,826 | 7/1959 | Stengel | 422/197 |
| 2,942,958 | 6/1960 | Dwyer | 423/650 |
| 3,397,962 | 8/1968 | Squires | 252/373 |
| 3,514,264 | 5/1970 | Sennewald et al. | 423/650 |
| 3,578,416 | 5/1971 | Pope | 423/650 |
| 3,685,977 | 8/1972 | Goodman | 252/373 |
| 3,751,228 | 8/1973 | Semenov | 252/373 |

FOREIGN PATENT DOCUMENTS 350555  5/1928  Belgium .
2809126  6/1979  Fed. Rep. of Germany .
866085   4/1961  United Kingdom .

Primary Examiner—O. R. Vertiz
Assistant Examiner—Wayne A. Langel
Attorney, Agent, or Firm—Weingarten, Schurgin, Gagnebin & Hayes

[57] ABSTRACT

In the production of hydrogen from hydrocarbons and water vapor a large portion of the heat which is required for heating the feedstock to the reaction temperature as well as for the endothermic reaction is recovered from the sensible heat of the reaction products. Additional heat is supplied by means of electric heating. An apparatus intended for carrying out the process comprises a recuperator, a reactor chamber and an additional heater housed in a common pressure shell.

1 Claim, 1 Drawing Figure

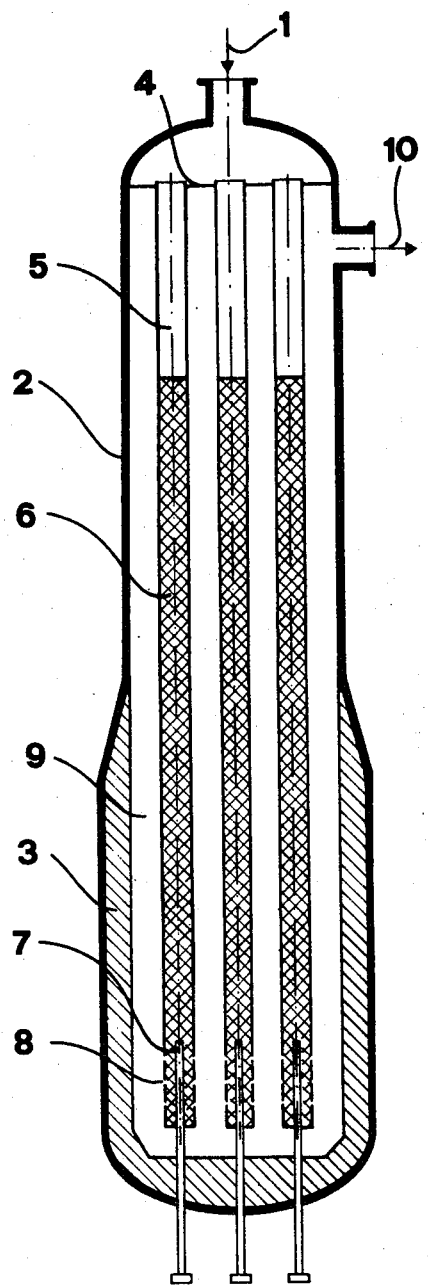

PROCESS AND APPARATUS FOR HYDROGEN PRODUCTION

The invention relates to a process for producing hydrogen under pressure by means of chemical reaction between hydrocarbons and water vapour and at a reduced consumption of hydrocarbons and energy.

Hydrogen is required in large quantities primarily as a component gas for the synthesis of ammonia or methanol.

Processes in which hydrocarbons are reformed by means of water vapour at high temperatures in endothermic reactions are known. The required heat is produced by internal or external combustion of an additional quantity of hydrocarbons. A total of approximately 30 to 40 MJ of energy are required for the production of 1 kg of ammonia.

Process of electrolysis of water and of thermolysis of water vapour are also known and the energies required for the dissociation can be supplied partially or entirely by nuclear heat or by electric energy. However, in none of these processes the total amount of energy required is substantially lower than that mentioned above. Moreover, the nuclear heat at the desired temperature level is not yet economically available and in most cases the electric energy is substantially more valuable than the calorific value of hydrocarbons.

Said high requirements of energy is primarily not due to physical limits, but it is due to the not substantially reducible irreversibilities in the known processes within an economical optimization.

It is the aim of the present invention to reduce substantially the requirement of hydrocarbons for the production of hydrogen (approximately to one half) a portion of said base materials thus saved being replaced by electric energy. However, the amount of electric energy required for the process according to the invention is several times smaller than that for the known electrolysis and the total energy required is still substantially lower than that for any known process. Furthermore, the process according to the invention is simplified as compared with known processes and the expenditure for the apparatus according to the invention is reduced as compared with known apparatus.

The present invention relates to a process for producing hydrogen under pressure by means of chemical reactions between hydrocarbons and water vapour with a reduced requirement of hydrocarbons and energy, in which a portion of the heat which is required for heating the feedstock from the ambient temperature to the reaction temperature, as well as for the endothermic reactions originates from the recovery of the sensible heat of the reaction products, and in which additional heat is supplied to the process gas by electric heating between the remaining heating of the feedstock and the cooling of the reaction products.

The said additional heat is required for promoting the recovery of heat and for covering the heat required by the endothermic reactions.

The additional heat can also be supplied by combustion of reducing agents with oxygen or oxygen-containing gases.

The process is to yield the reaction products preferably at high pressure in order to save the energy for their eventually required further compression. This results in the necessity of a high final temperature of the chemical reactions so that they proceed far enough.

However, the parts of the apparatus which are exposed to high temperatures cannot withstand high stresses. This problem can be solved in that the heat recuperator with the catalyst required for accelerating the chemical reactions and the electric heating device are housed in a common pressure shell, whose inside is entirely or partially heat-insulated and which is externally cooled in a suitable manner.

The invention will now be described in more detail by way of example with reference to the accompanying drawing.

The gas mixture consists of 1 mole of octane ($C_8H_{18}$) and 32 moles of water vapour ($H_2O$) and is continuously fed via the pipe 1 into the pressure shell 2 at a pressure of 100 bars and a temperature of 600 K. The lower end of the shell 2 is lined on the inside with a heat-insulating material 3.

The introduced gas flows through the tubesheet 4 into a number of pipes 5 connected in parallel. The upper end of the latter pipes is empty and the gas is heated therein to a temperature of 800 K. The subjacent end of the pipes 5 is filled with a known catalyst 6 and the gas is heated therein first to a temperature of 1100° K. by means of heat recovery and then to a temperature of 1500° K. by means of electric heating. At the same time the following chemical overall reaction takes place:

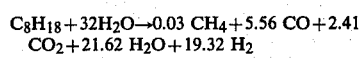

$$C_8H_{18} + 32H_2O \rightarrow 0.03\ CH_4 + 5.56\ CO + 2.41\ CO_2 + 21.62\ H_2O + 19.32\ H_2$$

In the lower portion of the pipes 5 heat is supplied by means of the electric heating rods 7, namely about 1.5 MJ per mole of $C_8H_{18}$. As mentioned hereinbefore, the remaining heat input is supplied by recovery of the sensible heat of the gas mixture to be cooled. From the interior of the pipes 5 the said gas mixture flows through the opening 8 into their external space 9 and flowing upwards this gas mixture is cooled to a temperature of 700° K. and finally leaves the pressure shell through the pipe 10.

In this example the temperature difference available for the heat transfer is 400° K. at the hot end of the recuperator and 100° K. at the cold end. This difference thus is sufficiently high to transfer the heat intensively. At the hot end the pipes can be made of ceramic material, if necessary.

According to the above overall reaction formula 19.32 moles of $H_2$ are produced from 1 mole of $C_8H_{18}$. Additional 5.56 moles of $H_2$ are produced by means of the known conversion of the available quantity of CO. Therefrom 0.28 kg of ammonia can be synthetized by means of known process steps without a substantial additional requirement of energy to be supplied externally. The lower calorific value of octane is 5.1 MJ/mole; consequently 18 MJ thereof are required per kg of ammonia. The previously mentioned electric energy, namely 1.5 MJ per mole of $C_8H_{18}$ or 5.4 MJ per kg of $NH_3$ must be added. The total requirement of energy might be slightly higher than the sum of the above two values and can be approximately 25 MJ per kg of $NH_3$. At any rate, this is only 70% of the average requirement of 35 MJ per kg of $NH_3$ in the known process. This saving does not differ substantially if hydrocarbons other than octane are used as the base material.

The other process steps of the ammonia or methanol production are sufficiently known and need not be described here.

The embodiments of the invention in which an exclusive property or privilege is claimed are defined as follows:

1. A process for producing hydrogen under pressure by means of chemical reactions between hydrocarbons and water vapor with a reduced requirement of hydrocarbons and energy, said process comprising the steps of:
    applying to one end of a reaction vessel a feedstock having hydrocarbons and water vapor therein;
    conducting the feedstock through a plurality of pipes containing a reaction catalyst; and
    heating the feedstock to the reaction temperature and supplying heat necessary for an endothermic reaction, said heating step comprising the steps of:
    circulating the products of the endothermic reaction in heat exchange relationship with the pipes within the reaction vessel to recover the sensible heat of the reaction products; and
    electrically heating the reacting gases in a portion of the reaction vessel spaced from the one end thereof after said circulating step and after the reaction has begun to complete the endothermic reaction within the reaction vessel and to raise the temperature of the gaseous reaction products to allow the recovery of the sensible heat thereof in said circulating step.

* * * * *